017# UNITED STATES PATENT OFFICE.

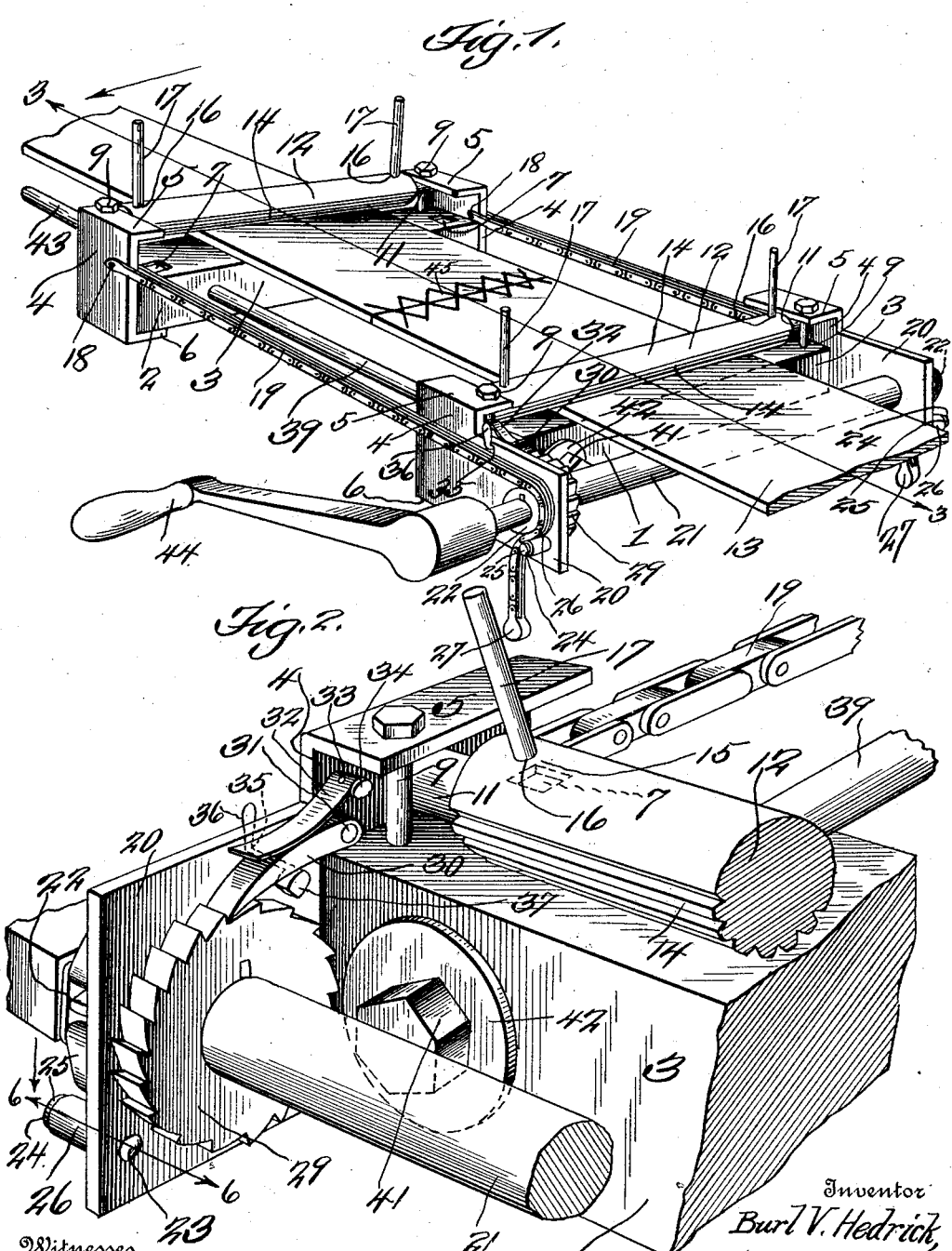

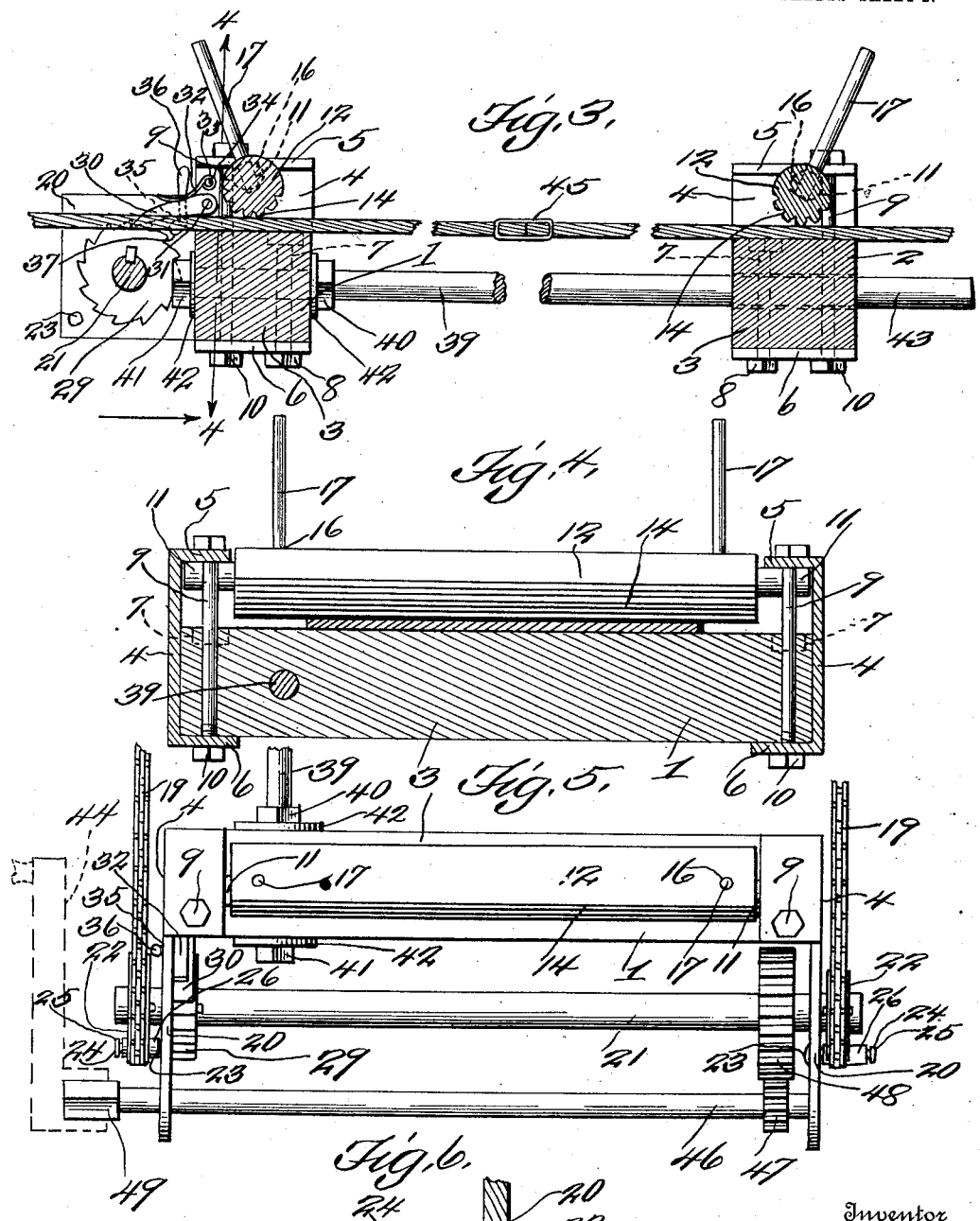

BURL V. HEDRICK, OF MILL CREEK, NORTH CAROLINA.

BELT-CLAMPING DEVICE.

1,049,855.  Specification of Letters Patent.  Patented Jan. 7, 1913.

Application filed July 13, 1912. Serial No. 709,168.

*To all whom it may concern:*

Be it known that I, BURL V. HEDRICK, a citizen of the United States, residing at Mill Creek, in the county of Person and State of North Carolina, have invented a new and useful Belt-Clamping Device; and I do hereby declare the following to be a full, clear, and exact description of the invention, such as will enable others skilled in the art to which it appertains to make and use the same.

This invention relates to a new and useful belt clamping device.

As one of the objects of the invention, it is the aim to provide a device of this nature, for clamping two ends of a belt while upon pulleys, and drawing them together in alinement, so as to lace the ends of the belt together.

A further object of the invention is to provide serrated rollers having eccentrically mounted pintles loosely and removably mounted under overhanging portions of bearing plates of the draw heads of the device, and to which partial revoluble movements may be imparted, so as to clamp the ends of the belt against the draw heads, owing to the eccentrically mounted pintles.

The invention aims as a further object to provide a draw head having end plates secured thereto by bolts, one of which of each plate acting as an abutment for one of the pintles of one of the rollers.

The invention aims as another object to provide connecting means between the draw heads, for instance chains of a sprocket chain character, so as to withstand great strength.

Another object of the invention is to provide novel means for holding one end of each chain upon its respective sprocket, there being means at the end of the chains to prevent the ends of the chains from pulling from between the holding means and the sprocket.

Another object of the invention is the provision of a mechanism for holding the draw heads in their adjusted positions relative to one another, after the belt has been once stretched, with the ends thereof adjacent one another.

Another object of the invention is to provide means for throwing said mechanism out of operation, so as to permit the chains between the draw heads to slacken, in order that the clamping device may be removed.

Another object of the invention is to provide means for guiding the draw heads relative to one another as the belt is being stretched.

In the drawings there has been disclosed a certain structure, but in practical fields this structure may require alterations, to which the patentee is entitled, provided the alterations are comprehended within the scope of what is claimed.

The invention comprises further features and combination of parts, as hereinafter set forth, shown in the drawings and claimed.

In the drawings:—Figure 1 is a view in perspective, showing a clamping device constructed in accordance with the invention, and as applied to a belt. Fig. 2 is a view in perspective, showing the structure at one end of one of the draw heads. Fig. 3 is a sectional view on line 3—3 of Fig. 1. Fig. 4 is a sectional view on line 4—4 of Fig. 3. Fig. 5 is a plan view of a belt clamping device, showing an extra shaft having gear connections with the shaft to which the chains are geared, in order to attain greater power in stretching the belt and bringing its ends together. Fig. 6 is a detail sectional view on line 6—6 of Fig. 2.

Referring more particularly to the annexed drawings 1 and 2 designate draw heads. The draw head 1 preferably consists of a beam 3 having end plates 4, which are provided with upper and lower lateral flanges 5 and 6. The flanges 6 are disposed close against the under surface of the beam 3, while the flanges 5 are positioned a slight distance above the beam, and to overhang the same. At each end of the beam a bolt 7 passes only through the beam and the flange 6, and is provided with a nut 8. Also at each end of the beam 3 a bolt 9 is provided, which passes through the flange 5, the beam and the flange 6, there being a nut 10 threaded to the lower end thereof. In this manner the end plates 4 are firmly secured to the beam. The bolts 9 perform two functions, namely, for assisting in holding the end plates secure, and acting as abutments for the pintles 11 of the clamping roller 12, between which and the head 3 one end of the belt 13 is clamped. As shown in the drawings, it will be noted, the pintles 11 extend eccentrically from the ends of the roller, in order that the roller may afford a cam clamping action on the belt, as will be discerned from Fig. 3. The roller is provided with serrations 14, in order that the belt may be more firmly clenched against the draw head. Each end of the roller is provided with an opening or aperture 16 to receive a key or the like 17, whereby a partial revoluble movement may be imparted to the roller. The draw head 2 is similarly constructed and equipped with parts corresponding to those of the draw head 3, as so far named, and are correspondingly designated with like characters.

Connected as at 18 to each end plate of the draw head 2 is a sprocket chain 19. The end plates of the draw head 3 are provided with extensions 20, in bearings of which a shaft 21 is mounted. Upon each end of the shaft 21 a sprocket 22 is fixed, about which the chains 19 are arranged. Fixed to the extensions 20, by means of riveting at 23, are stub pins 24, having heads 25, between which and the extensions rollers 26 are mounted upon the pin. These rollers are designed for the purpose of holding the chains in mesh upon and with the sprockets. One end of each chain 19 terminates in an enlargement 27, which cannot pass between the roller 26 and the sprocket 22, therefore preventing accidental displacement of the chain from between the roller and the sprocket. The sprockets 22 are arranged, one upon the outer face of each extension 20. Upon one end portion of the shaft 21 and arranged adjacent the inner face of one of the extensions is a ratchet 29, with which the pawl 30 pivoted at 31 engages, in order to prevent retrogression of the shaft 21. To hold the pawl 30 in engagement with the ratchet a spring 32 fixed at 33 to a stud 34 of one of the end plates 4 is provided, which spring bears against the pawl 30. Mounted in one of the end plates of the draw head 3 is a pin shaft 35 having a handle 36 at one end and a cam member 37 at the other. The cam member 37 is disposed beneath the pawl 30. By partially rotating the pin shaft 35, by manipulating the handle 36, the cam 37 will be actuated to raise the pawl 30 against the action of the spring 32, in order to disengage the pawl from the ratchet, thereby leaving the shaft 21 free to move, so as to permit the chains 19 to slacken.

Extending through the cross head 3 is a guide rod 39, the same being secured in position by the nuts 40 and 41, there being washers 42 interposed between the nuts and the cross head, in order to prevent wear. The end portion 43 of the guide rod extends telescopically through the cross head 2, as will be discerned from Fig. 1.

In order to lace the ends of the belt 13 together, the end portions of the belt are clamped between the clamping rollers 12, and then by imparting a rotary motion to the shaft 21, by means of the crank 44, the cross heads will be brought together, thereby bringing the ends of the belt in proximity to one another and in alinement, to be laced at 45, as shown in Fig. 1. The cross heads are brought together owing to the provision of the sprocket 22 and chain 19. In Fig. 5, however, the extensions 20 are slightly longer, in order to form bearings for the shaft 46, one end of which is provided with a spur pinion 47 to mesh with the spur gear 48 carried by the shaft 21, while the other end of the shaft is provided with a rectangular enlargement 49, to receive the crank handle 44. By this provision, as shown in Fig. 5, greater power may be attained, in order to stretch very large belts. The chains 19 are designed to be of considerable strength, in order to withstand all the strain necessary, for stretching the belt.

From the foregoing it will be noted there has been produced a novel, simple and inexpensive belt clamping device, for bringing the ends of a belt together for lacing, and one which has been found exceedingly desirable and practical.

The invention having been set forth, what is claimed as new and useful is:—

1. In a belt clamping device, a pair of draw heads having end plates provided with upper and lower overhanging flanges, the lower ones of which being arranged adjacent the under faces of the draw heads, while the upper ones are offset therefrom, means for securing the plates to the draw heads portions of which means constitute abutment means, and clamping rollers having eccentrically mounted pintles arranged under the upper overhanging flanges against the abutment means, and means for adjustably connecting the draw heads.

2. In a belt clamping device, a pair of draw heads having end plates provided with upper and lower overhanging flanges, the lower ones of which being arranged adjacent the under faces of the draw heads, while the upper ones are offset therefrom, means for securing the plates to the draw heads portions of which means constitute abutment means, and clamping rollers having eccentrically mounted pintles arranged under the upper overhanging flanges against the abutment means, and means for adjustably connecting the draw heads, and means for holding the draw heads in adjusted positions relative to one another.

3. In a belt clamping device, a pair of draw heads having end plates provided with upper and lower overhanging flanges, the lower ones of which being arranged adjacent the under faces of the draw heads, while the upper ones are offset therefrom, means for securing the plates to the draw heads portions of which means constitute abutment means, and clamping rollers having eccentrically mounted pintles arranged under the upper overhanging flanges against the abutment means, and means for adjustably connecting the draw heads, and means for holding the draw heads in adjusted positions relative to one another, and a device carried by one draw head and telescoping with the other draw head for guiding the draw heads relative to one another.

4. In a belt clamping device, a draw head having an overhanging member at each end, an abutment device extending through the overhanging member and the draw head, and a cam action clamping roller mounted under the overhanging member and against the abutment device, thereby loosely and removably mounting the roller.

5. In a belt clamping device, a draw head having an overhanging member at each end, an abutment device extending through the overhanging member and the draw head, and a ca maction clamping roller mounted under the overhanging member and against the abutment device, thereby loosely and removably mounting the roller, the abutment device constituting means to hold the overhanging member in place.

6. In a belt clamping device, a cross head, a plate secured to each end thereof and provided with an overhanging flange spaced apart from the cross head, a bolt passing through the flange and into the cross head for assisting in holding the flange in position and constituting an abutment, and a cam action clamping roller mounted between the overhanging flange and the cross head and against the abutment.

7. In combination, a pair of cross heads having cam action clamping rollers and provided with end members, connections between the cross heads, the end members of one of the cross heads having extensions provided with rollers, a manually operated member mounted in the extensions and provided with devices coöperating with the connections, whereby the cross heads may be adjusted relative to one another, the connections being operative between the devices of the manually operated member and the rollers.

8. In combination, a pair of cross heads having cam action clamping rollers and provided with end members, connections between the cross heads, the end members of one of the cross heads having extensions provided with rollers, a manually operated member mounted in the extensions and provided with devices coöperating with the connections, whereby the cross heads may be adjusted relative to one another, the connections being operative between the devices of the manually operated member and the rollers, the connections having enlargements to prevent their being pulled from between the rollers and the devices.

9. In combination, a pair of cross heads having cam action clamping rollers and provided with end members, connections between the cross heads, the end members of one of the cross heads having extensions provided with rollers, a manually operated member mounted in the extensions and provided with devices coöperating with the connections, whereby the cross heads may be adjusted relative to one another, the connections being operative between the devices of the manually operated member and the rollers, the connections having enlargements to prevent their being pulled from between the rollers and the devices, and a ratchet mechanism for holding the manually operated member adjusted.

10. In combination, a pair of cross heads having cam action clamping rollers and provided with end members, connections between the cross heads, the end members of one of the cross heads having extensions provided with rollers, a manually operated member mounted in the extensions and provided with devices coöperating with the connections, whereby the cross heads may be adjusted relative to one another, the connections being operative between the devices of the manually operated member and the rollers, the connections having enlargements to prevent their being pulled from between the rollers and the devices, and a ratchet mechanism for holding the manually operated member adjusted, and means for throwing the ratchet mechanism out of operation.

11. In combination, a pair of cross heads having cam action clamping rollers and provided with end members, sprocket chains connecting the cross heads, the end members of one of the cross heads having extensions provided with anti-rollers, a shaft mounted in anti-frictional extensions and provided with sprocket wheels over which the chains pass between the anti-frictional rollers and the sprockets, the chains having devices to prevent the chains from pulling from between the sprockets and the anti-frictional rollers, a ratchet mechanism coöperating with the shaft to hold the same in adjusted positions, and a device for throwing the ratchet mechanism out of operation.

In testimony whereof I have signed my name to this specification in the presence of two subscribing witnesses.

BURL V. HEDRICK.

Witnesses:
ROHE MEYER,
ROBERT A. BOSWELL.